Aug. 25, 1936.　　　A. T. COLWELL　　　2,052,279
VALVE MECHANISM
Filed Aug. 24, 1933　　　2 Sheets-Sheet 1
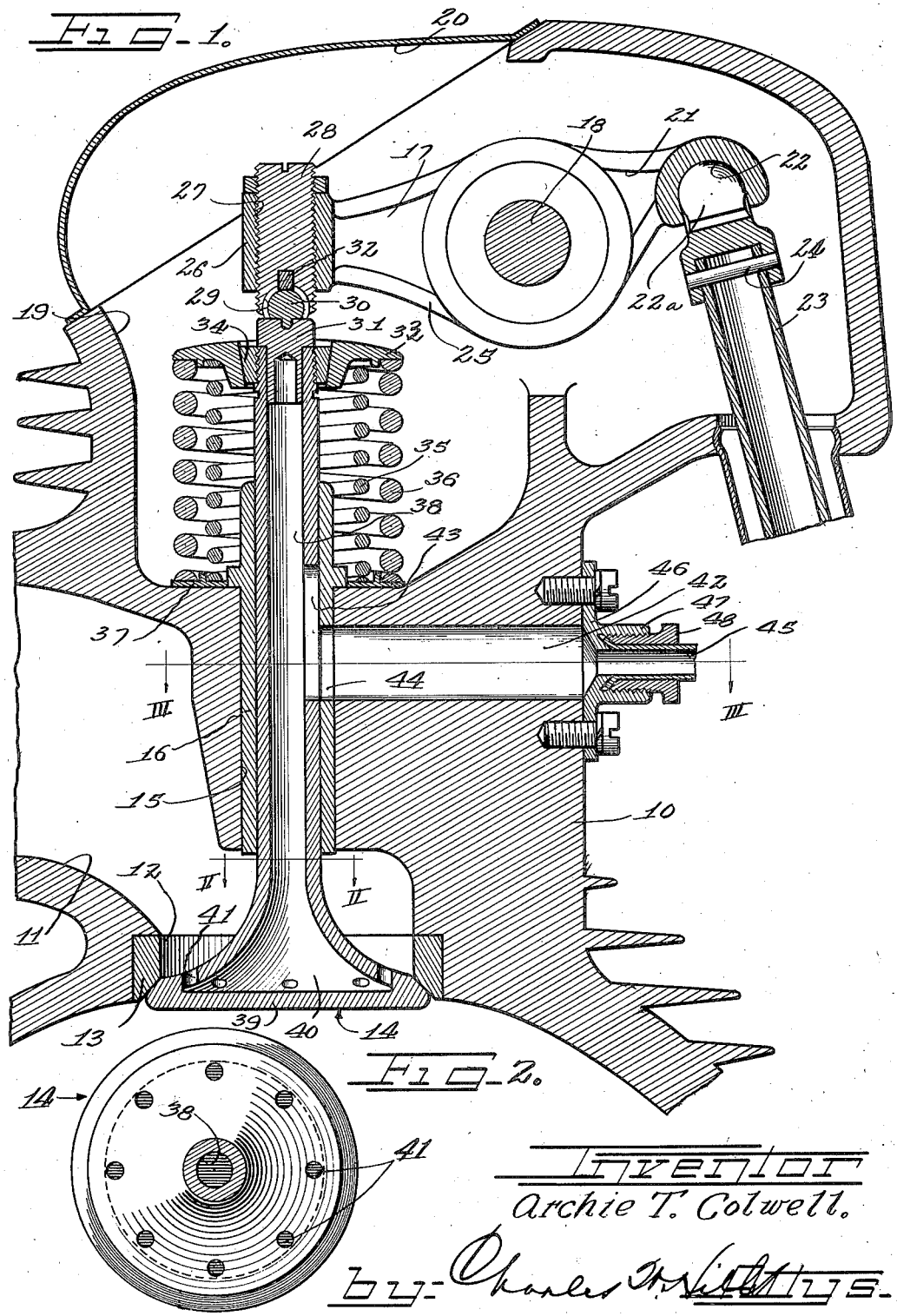
Inventor
Archie T. Colwell.

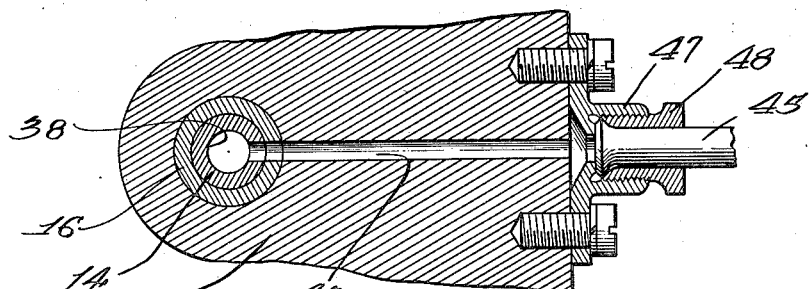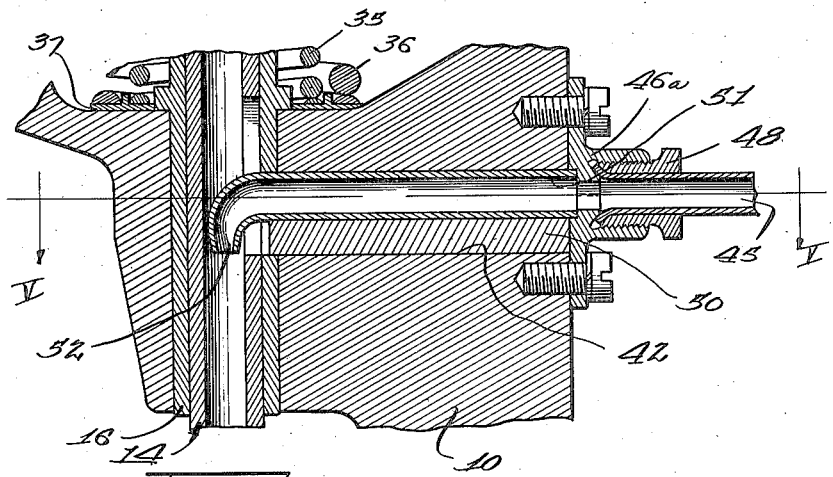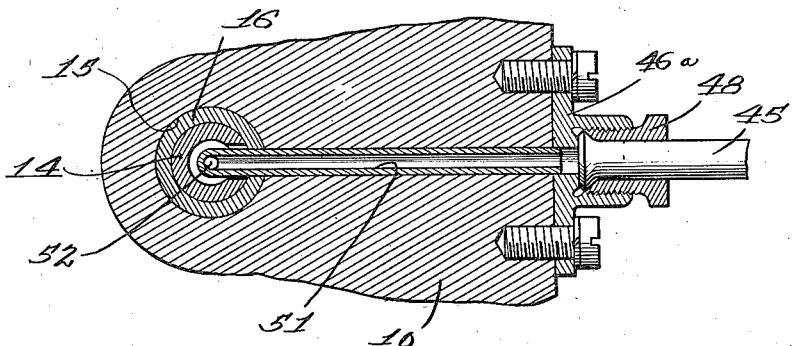

Patented Aug. 25, 1936

2,052,279

UNITED STATES PATENT OFFICE 2,052,279

VALVE MECHANISM

Archie T. Colwell, Cleveland, Ohio, assignor to Thompson Products Incorporated, Cleveland, Ohio, a corporation of Ohio Application August 24, 1933, Serial No. 686,509

5 Claims. (Cl. 123—177)

This invention relates to a valve mechanism and particularly to exhaust poppet valves for airplane engines through which air as a cooling medium is circulated.

It is well known that excessive heating of valves in internal combustion engines in time produces pitting, warping, burning, and other destructive effects on the valve. These effects in turn lower the efficiency of the engine.

To counter-act such effects, various forms of cooled valves have been devised. The present invention relates to valves of the type having means associated therewith for circulating air as a cooling medium therein.

It is an object of the invention to provide a valve having a passage therein for circulating a gaseous cooling medium therethrough.

It is a further object of this invention to provide a cooling system for valves and associated parts of an automatic engine wherein cooled air under pressure is forced through a hollow valve and discharged into the exhaust passageway of the engine.

It is also an object of this invention to provide a hollow valve having an entrance port in its stem portion and discharge ports about the periphery of its head portion through which a gaseous cooling medium is forced so as to be discharged about the head of the valve in the form of a shower.

Other and further important objects of this invention will be apparent from the following disclosures in the specification and the accompanying drawings.

This invention (in a preferred form) is illustrated in the drawings and hereinafter more fully described.

On the drawings:

Figure 1 is a vertical sectional view through a cylinder head of an airplane engine disclosing the invention applied thereto.

Figure 2 is a sectional view of the valve shown in Figure 1 taken on the line II—II of Figure 1.

Figure 3 is a sectional view taken on the line III—III of Figure 1.

Figure 4 is a fragmentary vertical section of the upper portion of a cylinder head disclosing a modified form of the invention applied thereto.

Figure 5 is a sectional view taken approximately on the line V—V of Figure 4.

As shown on the drawings:

This invention is disclosed in connection with the upper structure of a cylinder head, indicated generally at 10, of an airplane engine. The head 10 is provided with the usual exhaust passage 11 communicating with the cylinder through the port 12.

The port 12 is lined with a bushing 13 upon which a valve 14, for closing the port, is seated. The valve 14 slides in a cylindrical guide sleeve 16 that is positioned in an opening 15 through said head 10. The valve 14 is operated in the usual manner by a rocker arm 17 on a rock shaft 18 located in a recess 19 provided therefor in the head 10 and closed by the cap 20.

One arm 21 of the rocker arm 17 is provided with a semi-spherical recess 22 for receiving a substantially spherical ball member 22a mounted on the end of a reciprocating push rod 23 as by the pin 24.

The other arm 25 of the rock shaft 17 is provided with an end portion 26 having a threaded cylindrical opening 27 therethrough. A plug 28 is threaded in the opening 27 for abutting the end of the valve. The plug 28 is provided with a substantially semi-spherical recess 29 into which a substantially spherical ball member 30 mounted on a plug 31 attached to the valve, is fitted. The ball 30 is welded or substantially integrally connected to the plug 31 and is keyed to the plug 28 by the feather 32. Any well known construction may be used, however, in place of the specific construction described.

The end of the valve 14 is provided with a spring retainer collar 33 held in place by a lock 34 fitted into the recess of the collar and threaded to the end of the valve, or otherwise secured thereto. A pair of springs 35 and 36 are compressed between the spring retainer collar 33 and a collar 37 resting on the portion of the cylinder head 10 adjacent the valve stem.

This structure, as described above, is usual in the construction of the type of engine with which this invention is to be used and has not been disclosed to in any way limit the invention but to give a foundation for the description of the invention.

The valve 14 is provided with a hollow stem 38, which is closed at its tip end by the before mentioned plug 31. The valve 14 has a head 39 having a recess 40 therein formed as a continuation of the hollow stem 38. Apertures 41 are provided about the lower periphery of the head 39 and offer communication between the recess 40 of the valve and the exhaust passageway 11.

A passageway 42, of somewhat oval shape, is provided in the cylinder head 10. This passageway 42 is located in the head about midway between the ends of the valve and extends at right angles to the valve guide 15. The passageway 42 extends from the guide 15 to the outside of the cylinder head 10. The valve 14 is provided with a port 43 in its stem portion, which is of the same width as the passage 42 and which is of sufficient length to register with the passageway 42 in any position of the valve. The bushing 16 is provided with an opening 44, of the same cross-sectional area dimensions as the passageway 42 and serves as the communicating passage between the passageway 42 and the port 43 of the hollow valve.

The passage 42 is connected to a pipe line 45 leading from an air compressor (not shown). The pipe 45 is connected to the passageway 42 by a collar 46 bolted to the cylinder head 10 and having a socket member 47 into which the retaining member 48 is threaded. The end of the pipe is flanged outwardly and securely caught between the collar 46 and the retaining member 48, thus making an air tight connection.

In the modification of the invention, illustrated in Figs. 4 and 5, the passageway 42 is provided with a block 50. The block 50 supports a tube 51 which extends through the upper portion of the passageway 42 and has a constricted bent nozzle portion 52 extending into the hollow portion of the valve stem for directing the air passing through the tube toward the head of the valve. The tube 51 is connected with the pipe 45 in the manner described above except that the collar 46ᵃ has an inner periphery of slightly different configuration so as to make an air tight joint with the tube 51.

In operation, cooled air from a compressor is delivered to the valve by the line 45. A pressure of about two pounds has been found sufficient.

The air circulates toward the head of the valve, cooling the metal of the stem as it passes. A further cooling effect is produced as the air expands into chamber 40 in the head of the valve.

The air is delivered to the exhaust passageway through the apertures 41. The pressure under which the air is delivered causes it to be forced out of the aperture in the form of a shower against adjacent parts of the cylinder head thereby extending its cooling effect to the parts surrounding the valve.

The cooling effect on the valve is enhanced in the modification of Figs. 4 and 5. The expansion of the air as it leaves the nozzle 52 has an added cooling effect on the valve stem.

Also, the nozzle 52 directs the gaseous stream toward the head of the valve without substantial eddying, thus utilizing the full cooling effect of the gas stream.

The invention has been successfully applied to airplane engines and it has been found that valves which are ordinarily heated to a cherry red can be maintained black at all times.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In an internal combustion engine having an exhaust valve with a hollow head and a hollow stem, said hollow stem having an entrance port and said head having a plurality of apertures and a tube passing through said port and terminating in a nozzle directed toward said head for delivering air under pressure to said valve to be circulated therethrough and discharged through the apertures in the valve head.

2. In an internal combustion engine having an exhaust valve with a hollow head and hollow stem, said stem having an entrance port and said head having a plurality of apertures about its periphery and a tube passing through said entrance port and terminating in a discharge nozzle directed toward said head for delivering a stream of air under pressure to said valve to be discharged through said apertures, thereby cooling the valve and forming a protecting gaseous screen about the valve.

3. In an internal combustion engine having an exhaust valve with a hollow head and a hollow stem, said hollow stem being provided with an elongated entrance port in the side thereof, and said hollow head having a plurality of apertures in the bottom thereof, a tube passing through said port in spaced relation from the valve stem walls defining the port, a nozzle in said valve on the end of said tube directed toward the valve head, and means for delivering a cooling fluid under pressure to said tube for expansion through said nozzle and discharge through the apertures of the valve.

4. In a valve assembly, a supporting member including a valve seat, a valve having a stem slidable in said member and a head adapted to fit in the valve seat, said stem and head having communicating hollow chambers therein, said head having apertures communicating with said chamber therein and said stem having an elongated entrance port extending longitudinally therealong, a delivery tube extending through said port whereby said valve is held against rotation and means for delivering a cooling fluid through said tube for expansion in the valve chambers and discharge through the apertures in the valve head.

5. In a valve assembly, a supporting member, a poppet valve slidable therein, said valve having communicating hollow stem and head portions and apertures therethrough in communication with the hollow head portion thereof, said hollow stem portion having an elongated entrance port, a delivery tube passing through said entrance port terminating in a nozzle directed toward the valve head and means for delivering a cooling fluid through said tube for expansion through said nozzle and discharge through said apertures in the valve head whereby said valve is adapted to freely slide in said supporting member while receiving the cooling fluid therein.

ARCHIE T. COLWELL.